Aug. 30, 1938.    H. SCHOEN ET AL    2,128,564
DRINKING STRAW MANUFACTURING APPARATUS
Filed Oct. 7, 1933    7 Sheets-Sheet 1
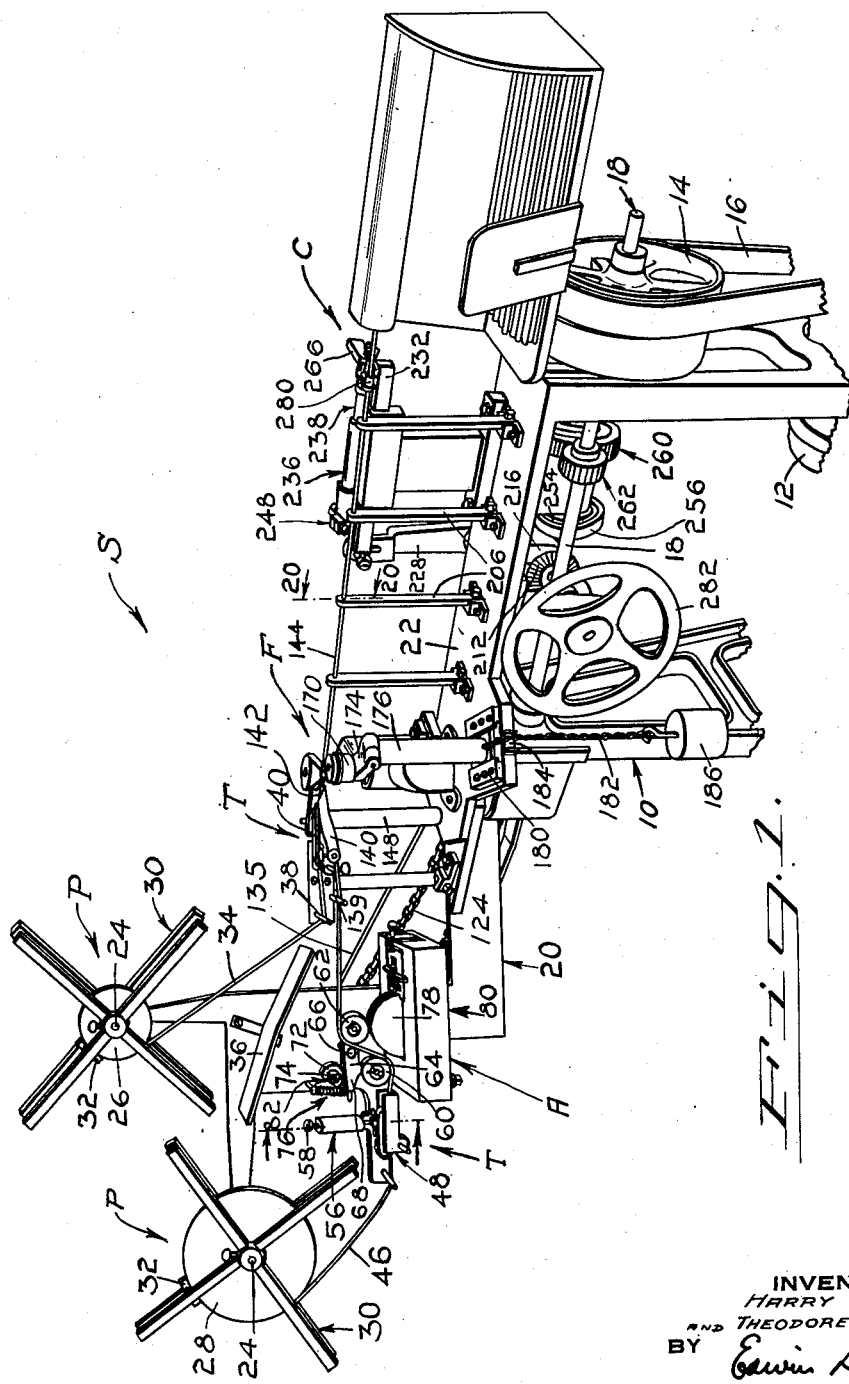
INVENTOR
HARRY SCHOEN
AND THEODORE PLETCHER.
BY
ATTORNEY

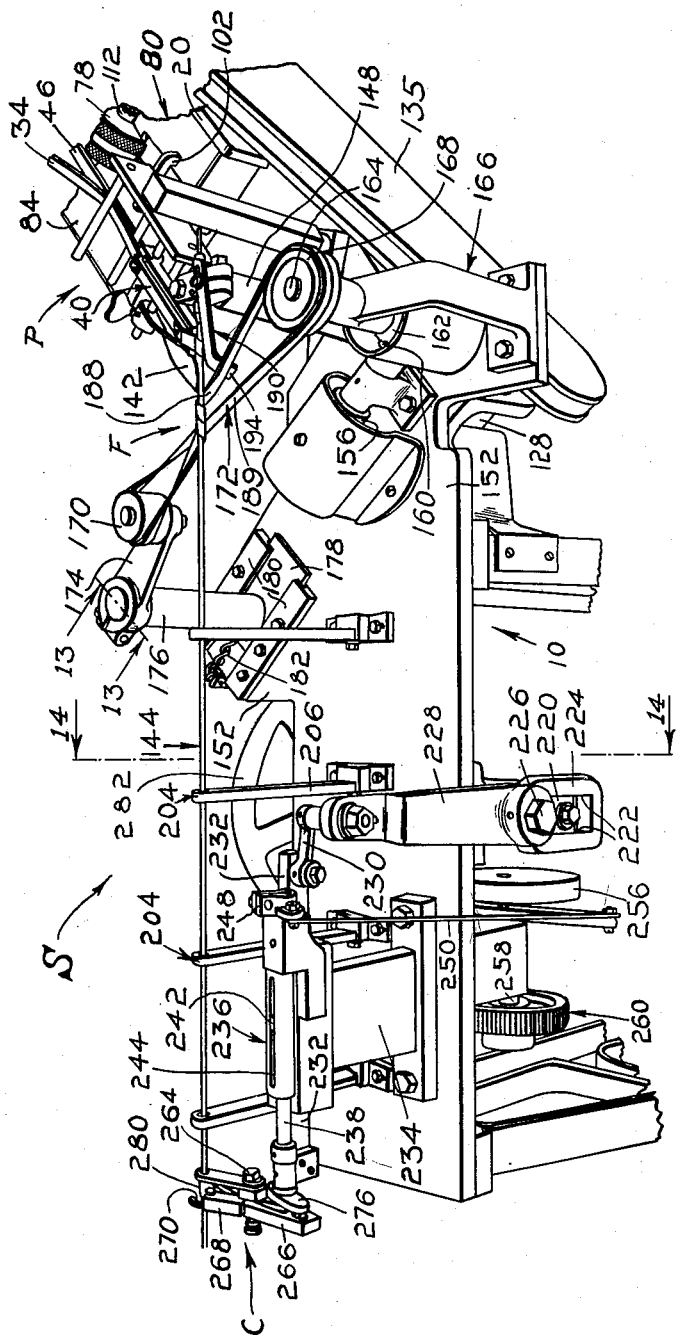
Aug. 30, 1938.  H. SCHOEN ET AL  2,128,564
DRINKING STRAW MANUFACTURING APPARATUS
Filed Oct. 7, 1933  7 Sheets-Sheet 2
INVENTOR
HARRY SCHOEN
AND THEODORE PLETCHER.
BY
ATTORNEY

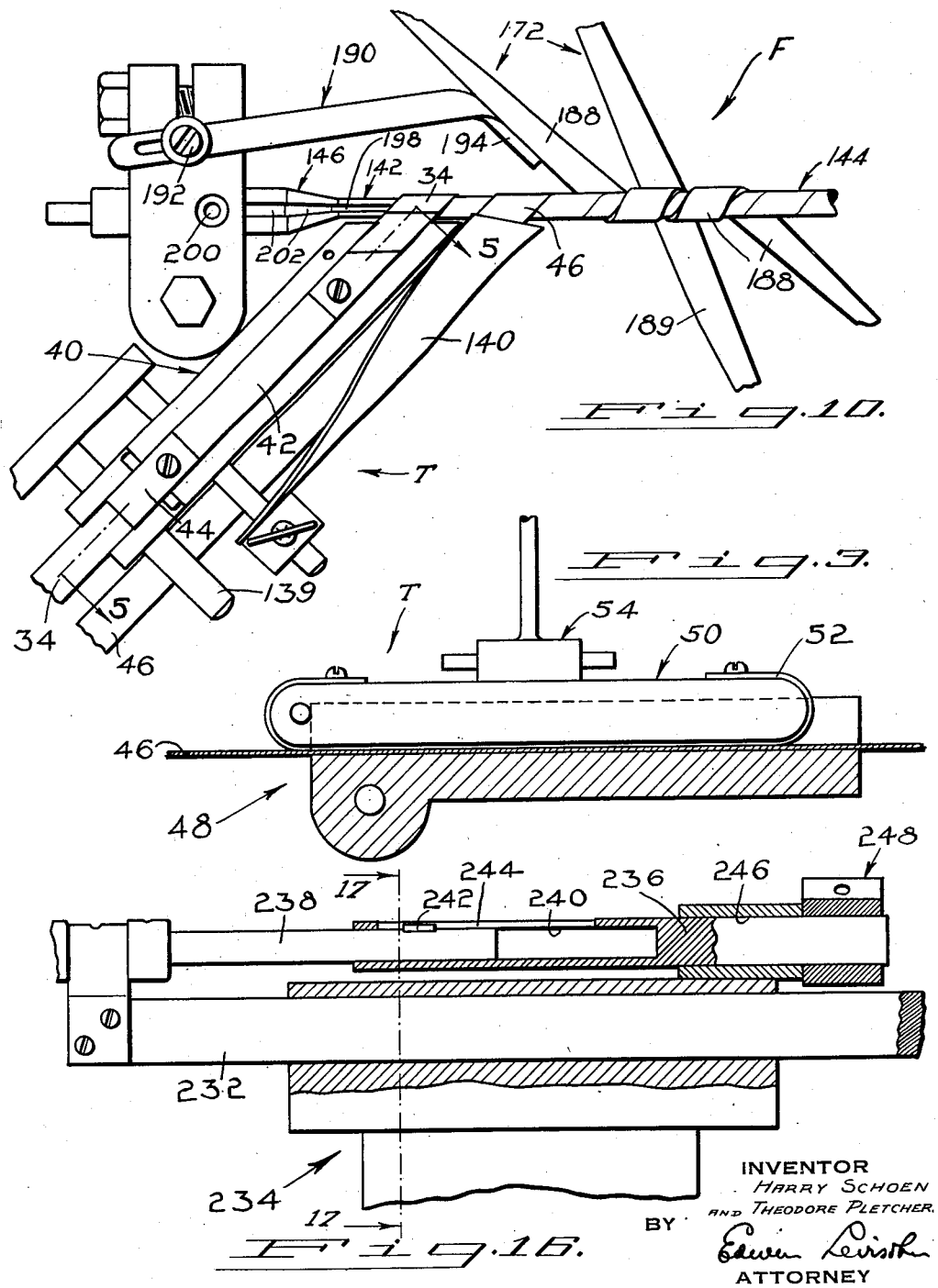

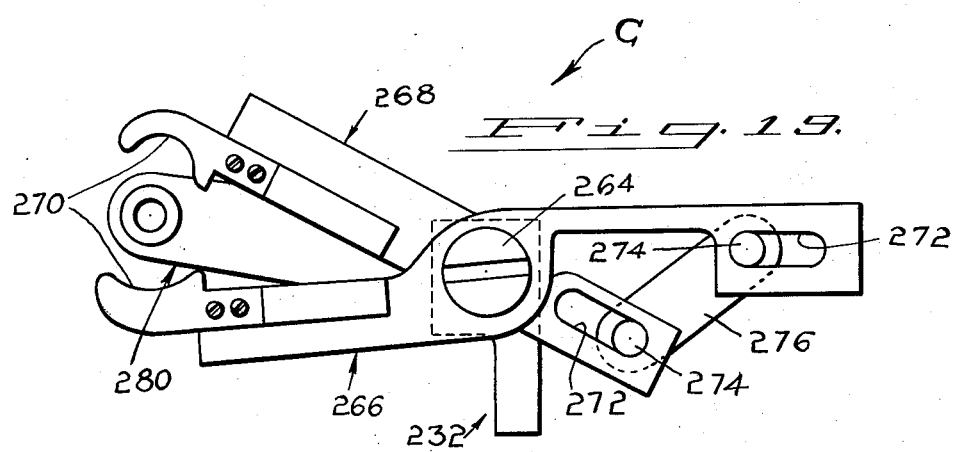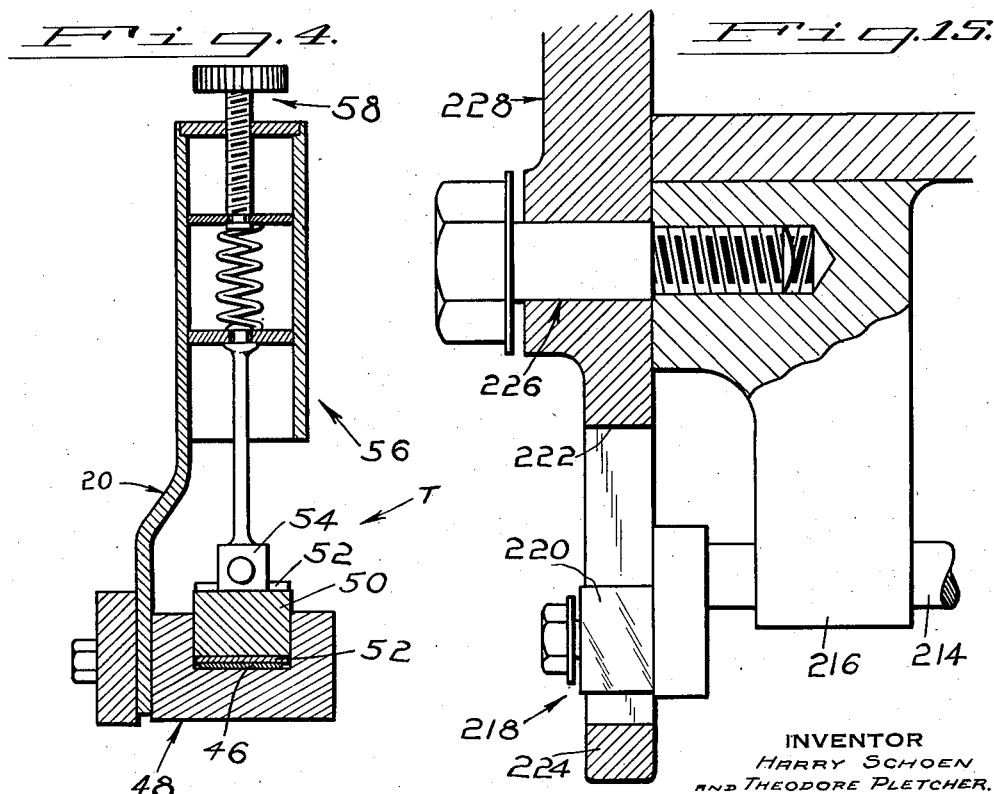

INVENTOR
HARRY SCHOEN
AND THEODORE PLETCHER
BY Edwin Lewis
ATTORNEY

Aug. 30, 1938.　　H. SCHOEN ET AL　　2,128,564
DRINKING STRAW MANUFACTURING APPARATUS
Filed Oct. 7, 1933　　7 Sheets-Sheet 6
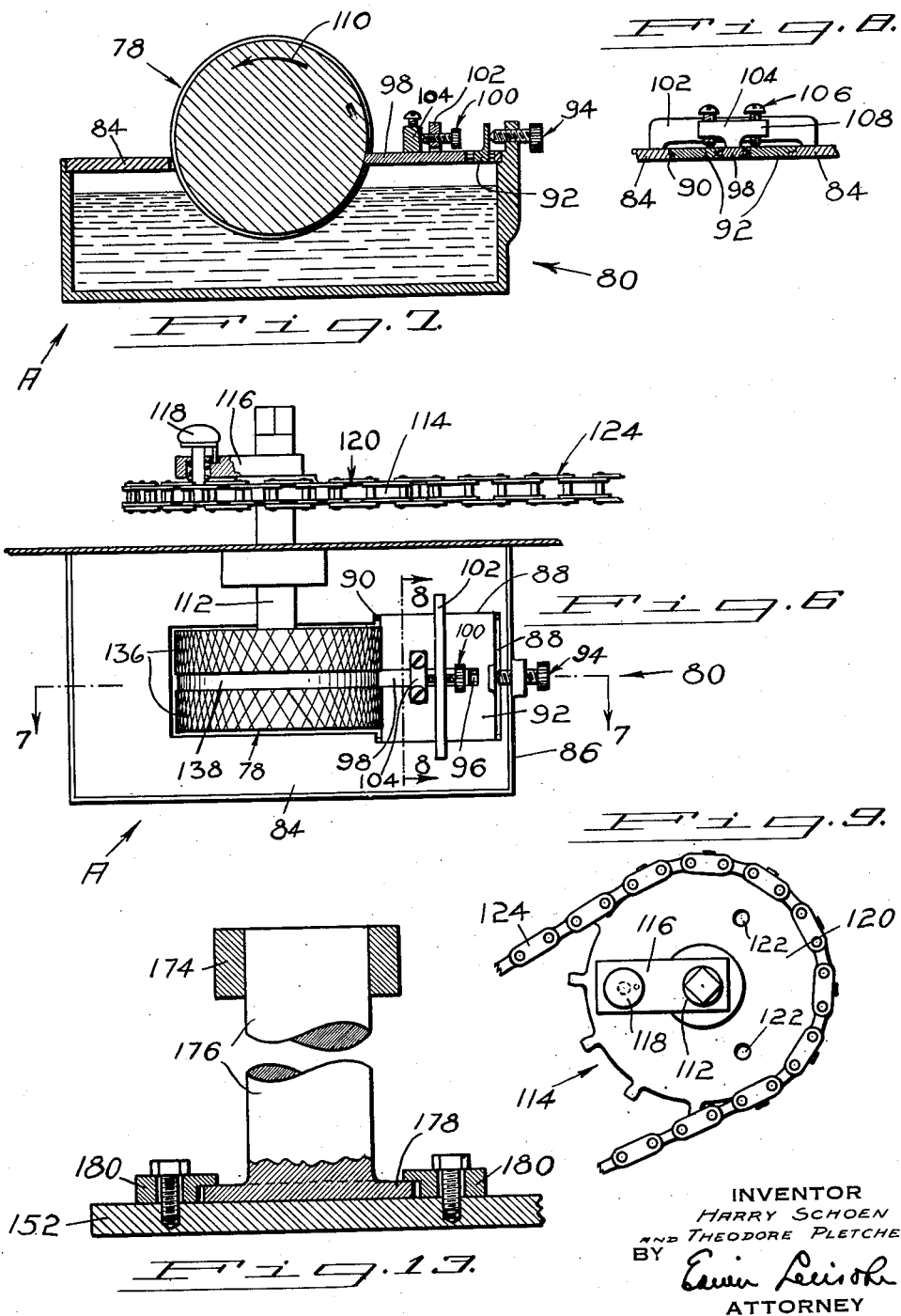
INVENTOR
HARRY SCHOEN
AND THEODORE PLETCHER.
BY
ATTORNEY

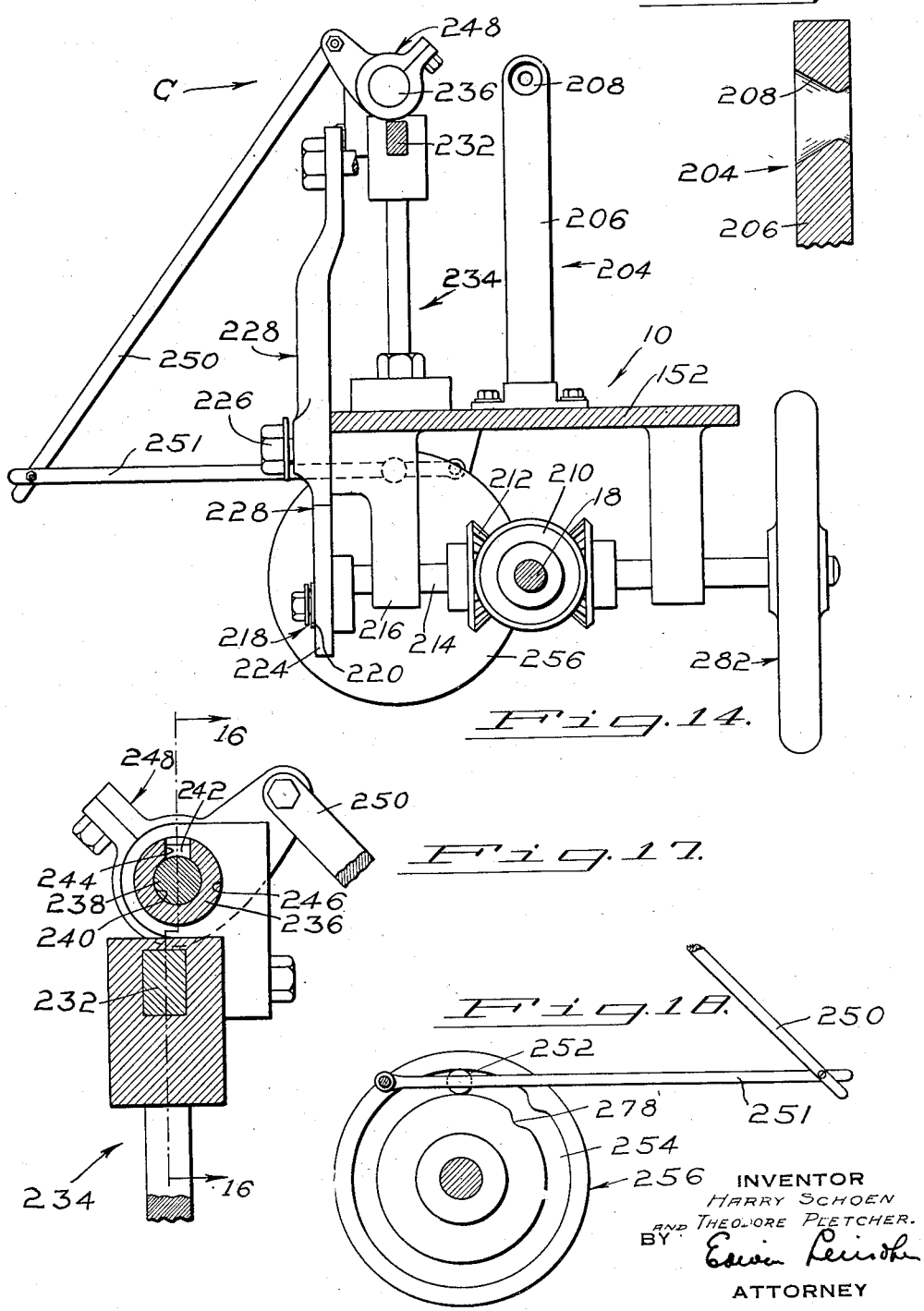

Patented Aug. 30, 1938

2,128,564

UNITED STATES PATENT OFFICE 2,128,564

DRINKING STRAW MANUFACTURING APPARATUS

Harry Schoen and Theodore Pletcher, Brooklyn, N. Y., assignors to Eagle Straw Corporation, Brooklyn, N. Y.

Application October 7, 1933, Serial No. 692,604

10 Claims. (Cl. 93—80)

This invention relates to drinking straw manufacturing apparatus.

One method of manufacturing the tubular members, commonly known as "drinking straws", involves twisting strips of paper into such tubes. The strips are fed over a mandrel with which other means cooperate to twist the strips helically, forming continuously a tube from which the drinking straw is finally cut. To effectuate this simple result requires, in most modern apparatus, complicated arrangements of parts and controls for different relationships of strip tensions, locations and speeds.

It is an object of the invention to provide a machine twisting paper strips to form tubular members in which the structure has been simplified by the elimination of a great number of parts while none of the necessary functions has been hampered. The twisting operation is easily and effectively carried out by this machine without complicated controls or mechanisms. It has been found possible to effect complete assembly of the tubes from paper strips by the use of but a single twisting belt cooperating with the mandrel, as against the customary plurality of belts, each in succession engaging the strips.

One of the great problems encountered in twisting paper strips for tube forming is in the regulation of the tension applied to the paper at the various stages of the process, from the step of feeding the strips from their rolls until a finished tube is discharged from the mandrel. The paper is not of any considerable strength; if, during feeding, two tensions should oppose each other, tearing of the paper strips probably will result. The adjustment of these tensions, therefore, and their accurate retention, so adjusted, becomes vital. The twisting belt, in gripping the paper strips, necessarily is under definite tension to produce the tractive effort as the paper strip is twisted around the mandrel. This tension must remain constant throughout the operation; otherwise, slipping of the paper through other preceding tensioning devices, or bulking may occur, with consequent breakage of the strip, or distortion of the tube. For this purpose, it is an object of the invention to provide means assuring constant tensioning of the belt, the effect of which, once set, will, at no time, vary. The tensioning effect is derived from a weighted member, acting against a standard carrying one of the belt pulleys. The constant force of gravity thus operates to maintain the paper in constant twisting tension, no matter what variation may occur in the length of the belt due to the action of such force or other factors.

Due to the possibility of shock at any point in the twisting operation, arising from slight variations in the speed of the driving motor by which, to some extent, the tension of the belt may be varied, as well as to the desire that the travel of the belt shall be constant at all periods of operation, it is desired that one of the pulleys, and preferably the driven pulley, should be capable of some cushioning effect, and also still to have the desired tractive effort. For this reason, at least one of the pulleys is made of soft, yet substantially firm, rubber, slightly roughened on its outer surface and capable of slight "give".

One of the great problems in the manufacture of drinking straws is to cut into desired lengths the tube while it is being formed continuously. The speed of formation of the tube is very high. To chop the rapidly moving tube by means of spring-actuated members has been found inefficient and inaccurate. The spring quickly loses its elasticity under the swift action necessary; also, the resistance of the spring, in addition to the customary inertia and frictional resistance of the parts, must be overcome. This spring resistance adds quite a factor to the power and the torques and pressures actually necessary to be transmitted. This increased power results in increased heating of the bearings carrying such chopping devices; it has also been found that the unbalanced action of such spring, in itself, creates an increased frictional state in the bearings. The power necessary to operate the scissors or like means, used for chopping the tube, against the action of the spring effecting the chopping stroke, has been found a large factor in the amount of heat created in the bearings of these parts.

It is an object of the invention to provide a mechanically operated tube chopping means, the actuation of which is carried out without the use of springs, either in effecting chopping or in positioning the apparatus for effectuation of that step. In one embodiment in which a scissors is used for chopping, the arms of the scissors are engaged by a sharply impelled crank to effect proper actuation of the scissors, the arms of the toggle being positively engaged and driven by mechanical elements directly connected to the drive shaft.

The paper strip, during and after twisting, must, in some manner, be retained in tubular form. For this purpose, one face preferably of one strip has applied thereto a coating of adhesive or glue. In the twisting operation, in which the two or more strips are simultaneously formed into a tube, the coated strip is made the outermost, and has its coated face disposed inwardly. By this association, the coated face comes into contact with the outer faces of the other strip or strips, and, by its adhesive action, serves to retain these strips in twisted form.

The adhesive, applied in moist state, must, at the end of the operation, have dried sufficiently so that, when the cutting is effected, the tube will continue in twisted condition. Access of air to, as also the movement of air about, the moving tube, therefore, becomes of material importance. For this purpose, it is an object of the invention to support the moving tube between the point at which it is so formed and the point at which it is severed so that, in passage between these points, the adhesive applied to the tube may sufficiently dry to retain the tube in twisted condition. A plurality of spaced apart standards, each having an opening, and the openings arranged in alignment with the mandrel around which the strips are twisted in forming the tube, produce a practical structure for carrying the tube between the two points while the results desired are effectuated. By such an arrangement, practically every part of the tube is, at all times, made accessible to air, and, due to the rapid movement of the tube, air in the immediate neighborhood of the tube is caused to swirl.

For the application of adhesive to the paper strip, a container for a supply of the adhesive is provided. From this container, at each stage of the process, a sufficient quantity of the adhesive is conveyed to coat the strip sufficiently as it moves along. Also it is desired to coat only one face of one of the strips.

In order properly to coat this one face, the travelling paper strip is positioned to engage over a roller carrying a coating of the adhesive. It has been found that the best results are obtained when practically the entire force causing the strip to travel along and pick up from the roller a supply of adhesive is the traction effect of the adhesive on the roller and the strip as the roller is rotated. By this means, but a small portion of adhesive was left upon the strip, and it was made unnecessary then to remove from the strip any excess of adhesive.

As a primary requisite of this arrangement, however, it was necessary that the roller should pick up but a small and substantially uniformly accurate quantity of adhesive. The roller directly contacting the strip could not, it was found, itself be immersed directly in adhesive, but had to pick up its load of adhesive from another roller immersed in the adhesive. With this other roller, there had to be arranged means for removing excess adhesive before it might be transferred to the strip engaging roller.

In order to assure proper feeding of adhesive to the strip by a proper applicator action, it was found desirable that the roller contacting the strip should be of compressible rubber, while the roller actually immersed in the adhesive in the container be of metal. A wet, smooth-faced metal roller was, however, found to be affected by quite a loss of positive traction; the metal roller, in slipping by the rubber roller, built up undesirable lumps or bumps of adhesive at different points on the rubber roller.

Knurling the metal roller increased the traction substantially and eliminated relative slippage of the rollers. But knurling the roller reduced the adhesive lifting power of the metal roller. A smooth groove, formed in the metal roller substantially at the position of the portion of the rubber roller engaged by the strip, served to supply to this portion the necessary amount of adhesive without materially affecting the tractive effort. Also, by reducing the effective feeding area, a micrometer adjustment of small extent became all that was necessary to control the amount of adhesive fed to the rubber roller at this particular area.

When starting up apparatus of this character, when the glue or mucilage is in cold, viscous condition, it is not desirable to load the motor additionally by the initial torque necessary to commence rotation of the roller embedded in the relatively stiff adhesive. For this purpose, means are provided whereby the machine, as a unit, may operate independently of the adhesive applying mechanism. Preferably, in apparatus of this character, only the metal roller, immersed in the adhesive, is driven, the rubber roller deriving its power from tractive contact with the metal roller.

As the paper strips are twisted around the mandrel, considerable friction results. At the very high speed at which the tube is being formed, this heat may become so great as to damage, or, in some other way, interfere with the formation of the tube. For this purpose, some lubricant, such as oil, is applied preferably to the inner strip which then deposits it upon the mandrel at the twisting area and reduces the heat created in the twisting operation. The oil may be applied in any desired manner; preferably it is fed on to the mandrel itself by passing from a cup, along a groove in the mandrel, to the point at which the strip may pick it up and carry it around the mandrel during the forming operation.

Other objects of this invention will hereinafter be set forth, or will be apparent from the description and the drawings, in which are illustrated embodiments of apparatus for carrying out the invention.

The invention, however, is not intended to be restricted to any particular construction or arrangement of parts, or to any particular application of such constructions, or to any specific methods of operation, or to any of the various steps or details thereof herein shown and described, as the same may be modified in various particulars or be applied in many varied relations without departing from the spirit and scope of the claimed invention, the practical embodiments herein illustrated and described merely showing some of the various forms and modifications in which the invention might be embodied.

Fig. 1 is a view in perspective of an apparatus for the manufacture of straws, embodying details of the invention, portions of the frame being broken away;

Fig. 2 is a view in perspective of the same apparatus as it appears from the opposite side, parts of the apparatus being broken away;

Fig. 3 is a longitudinal cross-sectional view vertically and longitudinally along through paper-retarding means applied in connection with the apparatus, portions being shown in elevation;

Fig. 4 is a view transversely of the paper-retarding construction of Fig. 3, illustrating a type of friction-pressure control means for use in association with such apparatus;

Fig. 5 is a transverse vertical cross-sectional view, on the line 5—5 of Fig. 10, illustrating the construction of another type of paper-friction device;

Fig. 6 is a plan view of the glue pot and its associated mechanism;

Fig. 7 is a longitudinal vertical sectional view, on the line 7—7 of Fig. 6;

Fig. 8 is a vertical cross-sectional view transversely of a detail of a part of the mechanism of the glue pot, as seen from the line 8—8 of Fig. 6;

Fig. 10 is an enlarged plan view of a detail of the paper-twisting apparatus;

Fig. 13 is a vertical transverse cross-sectional view, on the line 13—13 of Fig. 2, portions being shown in elevation and parts being broken away for the sake of clarity;

Fig. 14 is a view of the straw-cutting apparatus as seen from the line 14—14 of Fig. 2, parts being broken away for clarity;

Fig. 15 is an enlarged detail view, partly in section, to illustrate the construction of the crank for reciprocating the straw-cutting apparatus;

Fig. 16 is a longitudinal vertical cross-sectional view, on the line 16—16 of Fig. 17, portions being shown in elevation, illustrating the operation of the straw-cutting apparatus;

Fig. 17 is a vertical transverse cross-sectional view, on the line 17—17 of Fig. 16, portions being shown in elevation;

Fig. 18 is a view illustrating the manner in which the scissors-operating mechanism is controlled, the view being addressed to the face of the cam opposite from that appearing in Fig. 14;

Fig. 19 is an elevational view of the straw-cutting apparatus, taken from the end from which the straws, as finally cut, issue; and Fig. 20 is a vertical cross-sectional view, on the line 20—20 of Fig. 1, illustrating a detail of the straw-guiding means.

Figure 11:
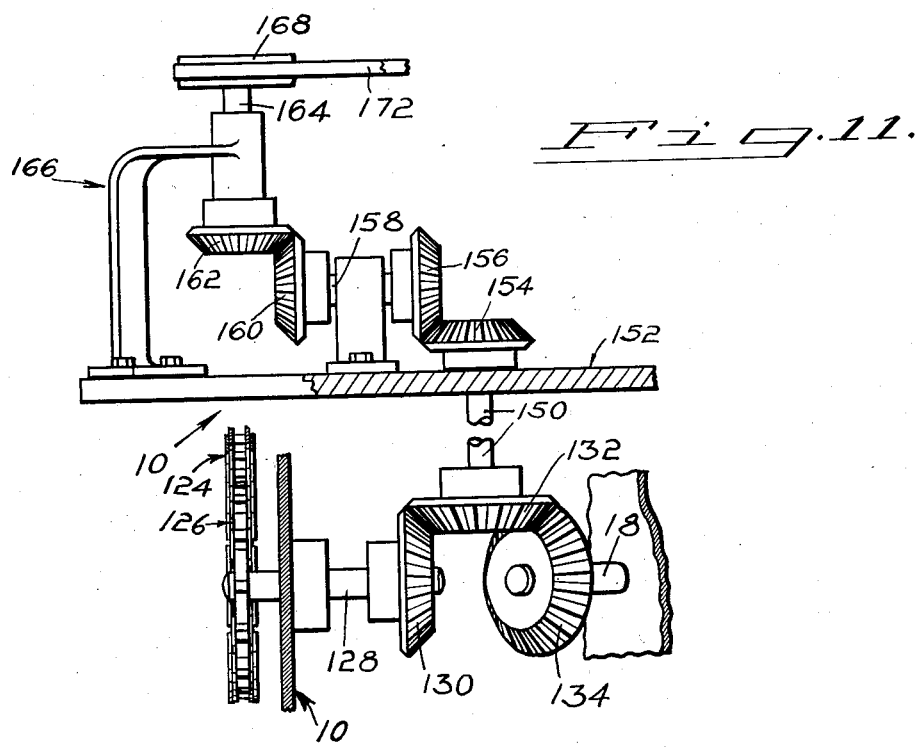
Fig. 11 is an elevational view, partly broken away, to illustrate the gear arrangement for driving the paper-twisting means.
Figure 12:
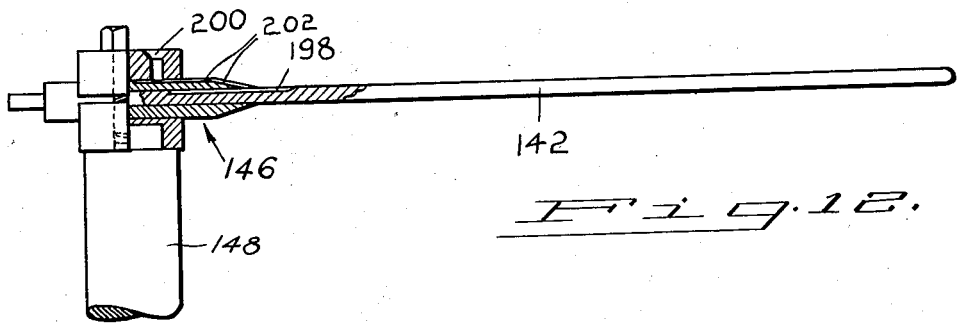
Fig. 12 is an elevational view to illustrate in detail the construction of the mandrel for the formation of the straw, portions being broken away in section.
Figure 9:
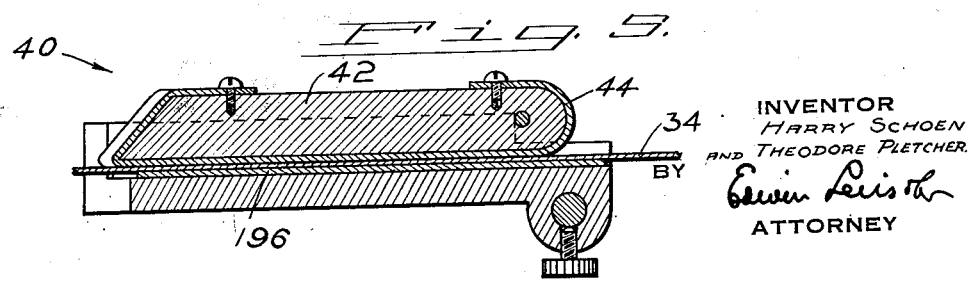
Fig. 9 is a view illustrating the construction of the clutch for the operating mechanism of the glue pot as seen in elevation, looking toward the extending end of the shaft carrying the glue pot roller in Fig. 6.

The straw-making apparatus S, appearing on the drawings, is seen to consist of paper supporting and feeding mechanism P, tensioning devices T, adhesive applicator A, tube former F, and tube cutter C. Preferably all of these elements are assembled and suitably supported on a base 10, upon which may also be mounted a power source or motor 12. The motor, by suitable pulleys 14 and a belt 16, drives a shaft 18, carried by the base, and from which preferably all movement of the apparatus is derived.

Carried upon a framework 20 extending angularly away from the main section 22 of base 10 are pins 24 upon which may be mounted rolls of paper strips, preferably two in number and indicated by the reference characters 26 and 28. Clamping members 30 are provided for the retention of the rolls upon their respective pins. These members may also apply sufficient pressure to the side faces of the rolls to retard unrolling of the strip during operation. In one preferable construction, members 30 do not directly engage the rolls, but a weight 32, carried upon the arms of each member, slides by gravity down against the roll and applies the necessary force for frictionally retarding rotation of the roll.

Strip 34 from roll 26 passes above a suitable guard plate 36 and then, beyond the plate, around pin 38 into a grooved member 40. In this grooved member is seated a weighted body 42, as shown in Figs. 5 and 10, so that one face, to which is applied a felt or like facing 44, will bear upon strip 34 and tend to retard its movements past member 40.

The other strip 46 passes directly from roll 28 to a guide 48 with which is associated a member 50, likewise having applied thereon a felt facing 52 for acting against movement of strip 46 through the guide. The effective resistance of this member 50 may be varied by adjusting the pressure exerted by a foot 54 carried in a standard 56. A thumb screw 58 provides an adjustment for a spring, retained within the standard and transmitting its pressure to foot 54.

Beyond guide 48, strip 46 passes under a driven guide roller 60 and then over roller 62. This roller is carried upon an arm 64, pivoted at 66 to framework 20. An extending portion 68 is engaged by a cam 72 upon a rotatable pin 74, bearings for which are provided in the framework. A suitable handle (not shown) is provided for rotating pin 74 to effect engagement of portion 68 by the cam or to release it from such engagement. A spring 76 normally pulls portion 68 upwardly and thereby urges roller 62 downwardly into engagement with a metal roll 78, bearings for which are provided in glue pot 80 carried upon the framework. When flat face 82 of cam 72 is turned to face portion 68, roller 62, by the action of the spring, will be forced into engagement with roll 78.

The glue pot preferably is of brass or some similar acid-resisting metal and is capable of carrying such quantity of glue or mucilage as may be necessary for continuous operation in the process here to be stated. If desired, this pot may be supplied with suitable means for retaining the glue at a desired temperature, if necessary for continuous operation of the apparatus. Preferably the top wall of the pot is formed by a removable cover or covers 84. At end 86 of the pot, a cut-out 88 may be formed and have guideways 90 formed in the opposed edges of the cut-out to receive a sliding wall 92. The position of this wall with relation to roll 78 may be determined by means of a set-screw 94. Within wall 92 is formed an opening 96 with grooved edges to receive a slide plate 98. The position of this plate with relation to wall 92 may be determined by means of a set-screw 100, carried by a bridge 102 supported from the cover 84, and engaging against an abutment 104 on the plate. Set-screws 106 may be carried by the extending ends 108 of the abutment to engage against the wall 92 and lock the plate relatively thereto.

Roll 78 is preferably of such diameter that it may extend down into the pot and also extend a suitable distance above the pot. At the latter position, roller 62 engages it. On rotation of the roll in the direction indicated by arrow 110, a quantity of glue will be picked up, this quantity being regulated by adjustment of wall 92 and of plate 98.

Roller 62 preferably is made of resilient rubber having some porosity. By such structure, more positive and effective pick-up of glue by the roller results, in addition to assured traction of the resilient material on the roll.

The roll itself is carried on a shaft 112, the bearings for which are formed or provided in the pot and on the framework; the shaft extends through the framework and carries on the extending end a sprocket wheel 114, loosely mounted on the shaft. Secured to the shaft is a crank 116 at the outer end of which is positioned a spring-pin 118. The pin normally has its end forced against the face 120 of wheel 114, or into one of a number of openings 122 formed through the wheel at the same radius from the center of the wheel as pin 118. By releasing pin 118 from engagement with the particular opening 122 with which it may be engaged, rotation of roll 78, when wheel 114 rotates, is interrupted. Wheel 114 derives its power from a sprocket chain 124 which extends to a pulley 126, carried upon a shaft 128, the bearings for which are in the base. Through a train of bevel gears 130, 132 and 134, power is transmitted from main shaft 18 to drive wheel 114. A housing 135 may be provided to guard against the danger of contact with chain 124, when the apparatus is in operation.

The speed of rotation of roller 62 is affected by the speed of rotation of roll 78 and slippage between roll and roller. To reduce this slippage to a minimum, and to make possible positive control of such speed, the face of the metal roll is knurled, as shown at 136, to secure more positive gripping between the faces of the metal roll and the soft rubber roller. Due to this knurling and the compressibility of the rubber roll, substantially complete engagement of these two parts is assured with subsequent positive transmission of linear speed from roll to roller.

It was found that knurling the metal roll reduced the amount of glue picked up from the pot by the metal roll and passed on to the rubber roller for application to strip 46. For this reason, a smooth surface 138 or a surface having slight knurling, was left in the metal roller immediately at that area which would contact the same surface of the rubber roller supplying adhesive to the paper strip. In such case, this limited surface would be depressed below the level of the knurled surface 136. Slide plate 98 is made sufficient in width merely to control the amount of glue fed by the restricted area of surface 138.

As will be seen from the drawings, strip 46 is fed along by roller 62 practically entirely due to the adhesion of the strip to the roller in picking up the necessary amount of adhesive. Beyond the roller, the strip after passing beneath pin 139, is engaged by a guide 140, which diverts the strip from a flat, horizontal position and disposes it in a position such that it will be fed upon mandrel 142 in proper relationship for twisting into a tube 144 to be constructed by tube former F. This slight tilt of the glued strip 46 was found an effective factor in producing firmly formed tubes. On the other hand, strip 34 may pass from member 40 practically flat. Mandrel 142 is disposed with relation to strip 34 at an angle such that a substantially helical structure will be produced from the two strips. The mandrel is preferably a steel pin of suitable length, extending from a chuck 146 which, in turn, is carried in an upright 148 on the base.

Bevel gear 134 engages bevel gear 132 to drive a vertical shaft 150, extending above table 152 of the base. At this point, another bevel gear 154 is secured to shaft 150 and is engaged by a bevel gear 156 at the end of a stub shaft 158. A bevel gear 160 at the end of shaft 158 transmits power to a bevel gear 162, driving a vertical shaft 164 carried in standard 166. A pulley 168 is secured to shaft 164, and, with pulley 170, carries a band belt 172.

Pulley 170 is carried on the end of an arm 174 which may be pivoted with relation to standard 176. The standard is secured to a cross-head 178, suitably retained within guides 180 on table 152. From the cross-head there extends a flexible belt member such as a chain or like connecting element 182, running over a pulley 184 at the edge of the table and supporting, at its free end, a weight 186. By this means, belt 172 is retained under tension. Pulley 168 preferably is of soft rubber, insuring traction and also reducing the effect, as the belt operates to twist the paper strips into a tube, of slight shocks in the transmission of power, without, in any way, applying any extreme stress to the strips during such operation.

As shown in Fig. 10, one section 188 of the belt is wrapped around the mandrel a pair of turns, while the other section 189 rides free and does not engage the mandrel. Section 188 also engages with the paper strips wrapped around the mandrel. As can be seen from Fig. 10, strip 34 is engaged about the mandrel in advance of the position at which the belt is engaged, as is also strip 46. Strip 46, however, is immediately at the edge of the belt, and thereby brings into immediate coaction with the belt the paper strip as it is being wound. Strip 46 also being the one to which adhesive has been applied, exerts a positive tendency to ride over and carry along with it the under strip to which no adhesive has been applied. The particular location of the section 188 is made the function of guard 190, carried from upright 148. A suitable adjusting means 192 may be provided on the standard for positioning the free end 194 of the guide.

The tension under which belt 172 is placed by weight 186 and the angle of attack of the belt upon the mandrel, as determined by the angularity of arm 174, are interrelated factors, determined by test in advance of continued operation. For similar conditions of operation, substantially the same setting of these parts will be found to function properly.

Since the mandrel is, in this case, not permitted any rotating movement, and the strips slide around the mandrel under the pressure of the belt, considerable heat will be produced by this friction. In order to reduce to a minimum the heated condition of the mandrel and the frictional resistance arising therefrom, it is desired to apply to one of the strips, and preferably to the under strip and to the face of that strip which will contact the mandrel, some lubricant such as oil. For this purpose, member 40 may have a felt base 196 to which oil may be applied at any stage of the operation, or even continuously by means of a cup and a passageway cut into the body of the member. Preferably, however, oil will be conducted to the strip by feeding it along the mandrel itself through a groove 198, cut in its top face. Oil may be fed to this groove either by a hand can, or by flow from a cup 200, secured to or made a part of chuck 146. A suitable passageway may conduct the fluid into a groove 202 in the chuck leading into the groove in the mandrel. Oil flowing along the mandrel will be picked up by the edge of the strip and then be carried around with the strip, lubricating the mandrel at the portions at which heat is created.

After the paper strips have been twisted into helices, and the glued face is engaged with the outer face of the under tube, the tube will leave the mandrel, sliding off it into guides 204. During travel through the guides, the tube must approach closely the final condition in which the glue has substantially dried and is effective to retain the strips together in their helical form. For this reason, guides 204, formed in this case by standards 206, extending upwardly from the table of the base, are provided at their upper ends with openings 208. These openings are substantially in alignment with the mandrel and preferably are tapered in the direction in which the tube is moving. Easier registry of the tube with the guides at the commencement of operation of the apparatus is thus assured. After that, the tube will continuously feed through the openings and through tube cutter C.

Intermediately of shaft 18 is affixed a bevel gear 210, transmitting power to a bevel gear 212 at the end of a shaft 214. This shaft has its bearings in a downward extension 216 from the table, and carries a crank 218 at its outer end. The crank consists of a block 220, pivotally mounted eccentrically of the shaft and reciprocating within a guideway 222 in an arm 224, which, in turn, is pivoted at 226 to the base. The upwardly extending portion 228 of the arm pivotally engages a link 230 pivotally connected to a slide 232. This slide is carried in a suitable standard 234, extending upwardly from the table.

The standard includes a tubular bearing 236 in which relatively reciprocates a pin 238, pivoted in a bearing 240 on the slide and retained against reciprocation relative to the slide. Pin 238 and tubular bearing 236 are held against relative rotation by engagement of a pin 242, extending from pin 238, with a slot 244 in bearing 236. The tubular bearing 236 is itself provided a bearing 246 in the standard. An end of bearing 236 has secured thereto a crank 248 to which is secured the end of a link 250, which, through a lever 251 pivoted at one end to the frame, is operated from a roller 252. The roller is engaged within the cam groove 254 of a cam 256. The cam is carried by a shaft 258 the bearings for which are in an extension from the table, the drive for the shaft consisting of gears 260 and 262, the latter being mounted on shaft 18.

Carried by the slide is a pivot post 264, upon which are pivotally mounted arms 266 and 268 at the outer ends of which are formed the cutting edges 270 of a scissors. The other ends of the arms have slots 272 provided for the engagement of pins 274, extending from a plate 276 at the free end of pin 238. By proper actuation of crank 248 through the sharp depression 278 in the cam groove 254 cooperating with roller 252, arms 266 and 268 will be oscillated to produce a scissor action of edges 270. Also, carried by the slide is a guide 280 through which the tube travels, after its passage from openings 208, and by which the tube is guided between edges 270.

The operation of cranks 218 and 248 is timed, through gears 260 and 262, so that the scissors action will occur once only in each complete pair of oscillations of the slide. The throw of the slide is controlled entirely by the relation of block 220 with respect to the center of shaft 214. The position at which the scissors becomes active is determined, of course, by the setting of the relation of the slide and the crank operating the scissors.

Beyond the scissors the cut straws may be collected in any desired manner and, after cutting to the correct length, they may be dipped in paraffin or otherwise sealed against the action of moisture. A suitable handle wheel 282 may be provided for independently actuating the apparatus without the use of the motor.

Many other changes could be effected in the particular apparatus designed, and in the methods of operation set forth, and in the specific steps or details thereof, without substantially departing from the invention hereof intended to be defined in the claims, the specific description herein being merely to illustrate operative embodiments carrying out the spirit of the invention.

What is claimed as new and useful is—

1. Drinking straw manufacturing means including a mandrel, a support positioned adjacent the mandrel, a driven pulley on the support, a movable support on the side of the mandrel removed from the driven pulley, an idler pulley on the movable support, and a belt extending between the pulleys and wrapped about the mandrel, the idler pulley being adjustable with relation to the movable support to vary the angle of belt and mandrel.

2. Drinking straw manufacturing apparatus including a base comprising two angularly related sections, strip supplying and adhesive applying means in position on one section, tube forming and severing means on the other section, a single power means for making the adhesive applying, tube forming and severing means effective in synchronism, and means for making the power means, at will, ineffective to drive the adhesive applying means while the latter remains in position.

3. Drinking straw manufacturing means including a mandrel, a support positioned adjacent the mandrel, a driven pulley on the support, a movable support on the side of the mandrel remote from the driven pulley, an idler pulley on the movable support, a belt extending between the pulleys and wrapped about the mandrel, a guide pulley, a flexible element passing over said guide pulley and connected at one end to said movable support, and a weight attached to the other end of said element and acting therethrough on said movable support for maintaining the belt under constant tension.

4. Drinking straw manufacturing means including a mandrel, a support positioned adjacent the mandrel, a driven pulley on the support, a movable support on the side of the mandrel remote from the driven pulley, a bracket carried by said movable support, an idler pulley rotatably supported by said bracket, a belt extending between said pulleys and wrapped about said mandrel, and a weight connected to said movable support for urging the latter and the pulley carried thereby away from said driven pulley to thereby automatically apply a constant tension to said belt.

5. Drinking straw manufacturing means including a mandrel, a support positioned adjacent the mandrel, a driven pulley on the support, a movable support on the side of the mandrel remote from the driven pulley, said movable support comprising a standard and a bracket carried at the upper end of said standard, an idler pulley rotatably supported by said bracket, a belt extending between said pulleys and wrapped about said mandrel, and a weight connected to said movable support urging the latter and the pulley carried thereby away from said driven pulley to thereby automatically apply a constant tension to said belt.

6. Drinking straw manufacturing means including a mandrel, a support positioned adjacent the mandrel, a driven pulley on the support, a movable support on the side of the mandrel remote from the driven pulley, said movable support comprising a standard extending bracket carried at the upper end of said standard and having its free end projected toward said mandrel, an idler pulley rotatably supported by said bracket adjacent the free end thereof, and a belt extending between said pulleys and wrapped about said mandrel.

7. Drinking straw manufacturing means including a mandrel, a support positioned adjacent the mandrel, a driven pulley on the support, a movable support on the side of the mandrel remote from the driven pulley, said movale support comprising a standard and a radially extending bracket carried at the upper end of said standard, an idler pulley rotatably supported by said bracket, a belt extending between said pulleys and wrapped about said mandrel, said bracket being angularly adjustable on said standard to vary the angle of belt and mandrel.

8. Drinking straw manufacturing means including a mandrel, a support positioned adjacent the mandrel, a driven pulley on the support, a movable support on the side of the mandrel remote from the driven pulley and movable toward and away from said driven pulley in fixed angular relation thereto, an idler pulley on said movable support, a belt extending between the pulleys and wrapped about said mandrel, and means adjustable circumferentially of the axis of said movable support to vary the angle of belt and mandrel.

9. Drinking straw manufacturing means including a mandrel, a support positioned adjacent the mandrel, a driven pulley on the support, a movable support on the side of the mandrel remote from the driven pulley and movable toward and away from said driven pulley in fixed angular relation thereto, a standard carried by said movable support, a radially extending bracket carried by said standard, an idler pulley rotatably mounted on said bracket, a belt extending between the pulleys and wrapped around said mandrel, said bracket being adjustable on said standard to vary the angle of belt and mandrel.

10. Drinking straw manufacturing apparatus including a base comprising two angularly related sections, strip supplying and adhesive applying means in position on one section, tube-forming and severing means on the other section, a single power means for making the adhesive applying, tube forming and severing means effective in synchronism, and means including a clutch for disconnecting said adhesive applying means from the power means to make the latter ineffective to drive the adhesive applying means while the latter is in position on said section.

HARRY SCHOEN.
THEODORE PLETCHER.